Feb. 3, 1942.  P. L. LOEWE  2,272,091
FLUID ACTUATED VALVE
Filed Nov. 9, 1940
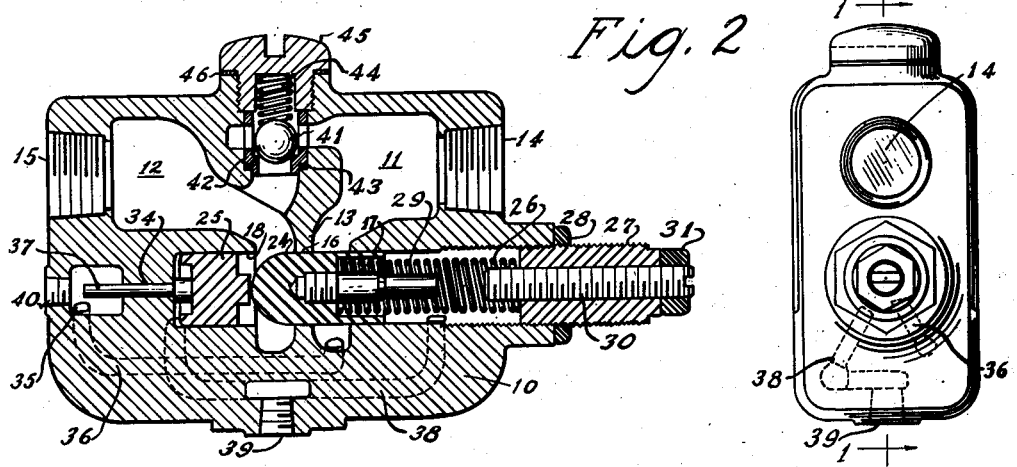
Fig. 1
Fig. 2
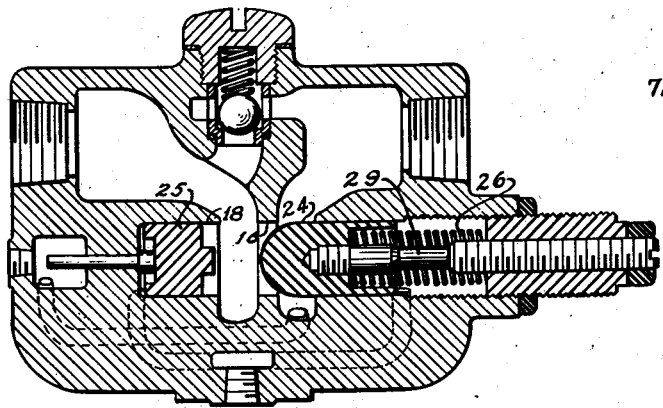
Fig. 3
Fig. 4
INVENTOR.
Peter L. Loewe
BY Hoodling and Krost
attys Patented Feb. 3, 1942

2,272,091

UNITED STATES PATENT OFFICE 2,272,091

FLUID ACTUATED VALVE

Peter L. Loewe, Logansport, Ind., assignor to Logansport Machine, Incorporated

Application November 9, 1940, Serial No. 365,096

5 Claims. (Cl. 277—60)

My invention relates in general to control valves and more particularly to fluid actuated control valves adapted to control the flow of fluid in a fluid system having fluid operated devices.

An object of my invention is the provision of a fluid operated valve which is governed in response to a building up of pressure to a predetermined value.

Another object of my invention is the provision of a fluid operated valve which gives a pre-determined and definite metering pressure.

Another object of my invention is the provision of preventing the valve parts from chattering.

Another object of my invention is the provision of a fluid valve which avoids the creation of a vacuum therein by the movement of the valve piston.

Another object of my invention is the provision of a valve which admits free return passage of the fluid.

Another object of my invention is the provision of an automatic fluid valve to operate a plurality of fluid devices in a fluid system, in which one of the fluid devices, for example, comprises a holding device for holding a work piece and in which another fluid device, for example, comprises a work performing device, the arrangement being such that the holding device is operated first after which the work performing device is operated.

Another object of my invention is to avoid, in a fluid operated valve, large springs which are expensive and which produce inaccurate results.

Other objects and a fuller understanding of my invention may be had by referring to the following description and claims, taken in conjunction with the accompanying drawing, in which:

Figure 1 is a longitudinal cross-sectional view of a valve embodying the features of my invention;

Figure 2 is an end view of the valve shown in Figure 1;

Figure 3 is a view similar to Figure 1 except that it shows the valve parts in a different operating position, and Figure 4 is a diagrammatic view of a simple control system in which my valve finds useful application.

With reference to the drawing, my valve comprises a casing 10 having a first compartment 11 and a second compartment 12 separated by an intermediate partition 13. The fluid inlet for the valve casing is represented by the reference character 14 and the fluid outlet is represented by the character 15. The partition 13 is provided with a bore 16 and constitutes a valve opening from one of the compartments to the other. As illustrated, the bore also extends longitudinally into the casing on opposite sides of the partition 13 and forms a first bore portion 17 on the right side of the partition and a second bore portion 18 on the left side of the partition. The bore is of the same dimension or diameter throughout its entire length. Slidably mounted in the first bore portion 17 and the bore 16 of the partition is a main valve piston 24 which is arranged to regulate the flow of the fluid from one compartment to the other. A second piston 25 is slidably mounted in the second bore portion 18. A relatively light spring 26 is arranged to bias the main valve piston 24 to the left to its closed position into the bore 16 of the partition as shown in Figure 1. The movement of the main valve piston 24 to the left to its closed position is limited by the forward end of the valve contacting the forward end of the second piston 25. The main valve piston 24 and the second piston 25 are mechanically free to move away from each other as they recede into their respective bore portions.

The main valve piston 24 and the second piston 25 are actuated to their right by a pressure responsive plunger 37 located in the rear or to the left of the second piston 25. The pressure responsive plunger 37 is reciprocably mounted in a longitudinal opening 34 that extends from the left-hand end of the second bore portion 18 over to an extended portion or chamber 35 of the first compartment 11 through a core 36 shown by the dotted lines in Figure 1. In accordance with this arrangement, the right-hand end of the pressure responsive plunger 37 engages the left-hand or rear end of the second piston 25 and the left-hand end of the pressure responsive plunger 37 is exposed to the pressure which builds up in the first compartment 11 and which extends over through the core 36 to the extended portion or chamber 35. The screw plug 40 in the left-hand end of the casing 10 is used to fill up the hole made in the casing when boring the longitudinal opening 34. Upon the building up of pressure of a predetermined value in the first compartment 11, the pressure responsive plunger 37 actuates the second piston 25 and the main slide valve piston 24 to the right, compressing the compression spring 26. The adjustment of the compression of the spring 26 may be set at a predetermined value by operating the spring adjustment threaded member 27. A jam nut 28 may be provided to prevent the spring adjustment member 27 from turning when once set. The limit of movement of the main valve piston 24 to the right toward its open position is determined by a stop pin 29 engaging a stop adjustment screw 30. As shown, the stop pin 29 may be carried by the main valve piston 24 and is positioned internally of the spring 26. The stop adjustment screw 30 is threadably mounted within the spring adjustment member 27. When the adjustment of the stop adjustment screw 30 is once determined it may be secured in place by the jam nut 31. The arrangement of the stop pin 29 and the adjustable stop adjustment screw 30 may be referred to as a metering adjustment to regulate the flow of the fluid from one compartment to the other. In the event that fluid leaks past the main valve piston 24 and past the second piston 25 and past the pressure responsive plunger 37, it may drain through a core 38 to a drain outlet 39.

As shown in Figure 1, a ball check valve 41 is positioned between the first compartment 11 and the second compartment 12 of the valve casing. The ball of the ball check valve 41 is adapted to seat into a replaceable seat 42 having a shoulder which rests upon a suitable packing 43 such, for example, as a Neoprene washer. A spring 44 mounted under a threaded cap 45 is arranged to constrain the ball against the replaceable seat 42. A gasket 46 may be positioned under the cap 45 to prevent fluid from seeping from the casing. The ball check valve 41 admits the free flowing of the fluid from the compartment 12 to the compartment 11 but restricts the flow of the fluid from the compartment 11 to the compartment 12.

The operation of my fluid control valve may be best understood by explaining its function in connection with a simple diagrammatic fluid system, shown in Figure 4, comprising a fluid holding cylinder 50, a fluid work performing cylinder 51, a pump 53, a sump 54, a four-way fluid control valve 52 actuated by a handle 55, and my control valve indicated by the reference character 10. A piston 48 within the fluid holding cylinder 50 is arranged to operate a clamp or jaw 67 for holding a work piece 65 firmly against a stationary support 66. A piston 49 within the fluid work performing cylinder 51 is arranged to move a work performing device 68 such, for example, as a drill within a support 69 relative to the work piece 65 by a bell crank 70. In the illustrated fluid system, my fluid valve 10 is arranged to cause the work 65 to be securely clamped in position before the work performing device 68 is brought in working engagement therewith. The delayed operation of my valve for bringing about the above described function may be explained as follows: Upon the actuation of the control handle 55 of the four-way valve to one position, fluid flows from the sump 54 through a pipe 59 to the pump 53, and then through the four-way valve and the pipes 61 and 60 to the rod end of the fluid holding cylinder 50. The fluid actuates the clamp 67 downwardly and holds the work piece 65 against the stationary support 66. Fluid from the pipe 61 also flows through the pipe 62 into the first compartment 11 of my valve casing 10 where it is blanked off from flowing into the second compartment by the main valve piston 24, until a predetermined build-up of pressure is obtained. The build-up of pressure in the fluid compartment 11 is established upon the piston 48 of the fluid holding cylinder 50 meeting resistance as a clamp 67 presses against the work piece 65. Just as soon as the movement of the clamp 67 is arrested or just as soon as a definite amount of resistance is encountered by the piston 48, the pressure within the extended portion or chamber 35 of the first compartment 11 acting upon the left-hand end of the pressure responsive plunger 37 overcomes the force of the spring 26 and forces the second piston 25 and the main valve 24 to the right, until fluid can pass through the bore 16 of the partition 13. The fluid upon flowing into the compartment 12 then passes through a pipe 71 to the rod end of the work performing cylinder 51, whereupon the pressure within the fluid actuates the work tool 68 into working engagement with the work piece 65.

As the main valve piston 24 moves to the right it would tend to create a vacuum in the compartment 12 since this compartment is connected by fluid pipe connections to the cylinder 51, but I overcome or avoid this vacuum by the simultaneous movement of the second piston 25 to the right. The chamber in the rear of the second piston 25 is connected by the core 38 to the drain outlet 39 and a pipe 72 to the sump 54, and thus as the second piston 25 moves to the right there is no vacuum created in the rear thereof since it is connected to atmosphere through the sump 54. Also, upon the main control valve piston moving to the right, a cushion would tend to be built up behind it, but this cushioning is relieved since the space in the rear of the main valve piston 24 is connected by the core 38 to the drain outlet 39 and thence to atmosphere through the sump 54. Therefore, the avoidance of the vacuum in the compartment 12 as well as the avoidance of the cushioning behind the main valve 24 gives smooth operation to my valve and prevents uneven operation or chattering thereof during its operating movement.

Upon the main control valve piston 24 being actuated to the right to its open position, fluid flows from the compartment 11 to the compartment 12 and thence to the rod end of the fluid cylinder 51. In its open position, the forward or left-hand end of the main control valve piston 24 is exposed to the pressure in the compartment 12 and this pressure acting upon the large area of the forward or left-hand end of the main control valve piston 24 keeps the valve in its full metering open position. The pressure in the compartment 12 also acts upon the large area of the second piston 25 and forces it, as well as the pressure responsive plunger 37, to the left. This position is shown in Figure 3 of the drawing. The rate of flow or the metering of the fluid through the valve opening depends upon the distance between the main control valve piston and the bore 16. This distance as explained before is regulated by the stop adjustment screw 30.

As the piston 48 within the fluid cylinder 50 and the piston 49 within the fluid cylinder 51 are moved downwardly, the fluids in the blind ends thereof are drained through the pipes 57 and 58, and the pipe 56, the fourway valve 52, and the pipe 73 to the sump 54.

Upon the actuation of the handle 35 of the four-way valve 52 to its neutral position, in which case fluid is blanked off from flowing to my valve 10, the pressure within the first compartment 11 is relieved and the spring 26 pushes the main control valve piston to the left towards its closed position. The main control valve piston, upon its movement to the left, displaces fluid within the compartment 12, which fluid is allowed to escape through the ball check valve 41 into the compartment 11, thus balancing the entire fluid system.

Upon reversing the four-way valve 52, the fluid flows from the pump through the four-way control valve and then through pipes 56, 57 and 58 to the blind ends of the fluid cylinders 50 and 51 to operate the pistons 48 and 49 simultaneously in the reverse or upward direction. The fluid from the rod end of the cylinder 50, upon the upward movement of the piston 48, flows through the pipes 60 and 61, and the four-way control valve 52 to the sump. The fluid in the rod end of the fluid cylinder 51 upon the upward movement of the piston 49, flows through the pipe 71 in the compartment 12, where it may freely flow through the ball check valve 41 to the compartment 11 and thence through the pipes 62 and 61 to the four-way control valve 52 and then to the sump 54.

Therefore, I provide an automatic fluid valve which is useful in operating a plurality of fluid devices in a fluid system, in which one of the fluid devices, for example, comprises a holding device for holding a work piece and in which another fluid device, for example, comprises a work performing device, the arrangement being such that the holding device is operated first after which the work performing device is operated.

Although I have described my invention with a certain degree of particularity, it is understood that the present disclosure has been made only by way of example, and that numerous changes in the details of construction and the combination and arrangement of parts may be resorted to without departing from the spirit and the scope of the invention as hereinafter claimed.

I claim as my invention:

1. A fluid valve comprising, in combination, a valve casing having a first and a second compartment separated by a partition, said partition having a bore passing therethrough and constituting a valve opening from one of said compartments to the other, said bore also extending longitudinally into the casing upon opposite sides of the partition and forming a first bore portion on the first compartment side of the partition and a second bore portion on the second compartment side of the partition, a slidable valve piston reciprocally mounted in the first bore portion and extending across the first compartment into the bore of the partition to regulate the flow of fluid from one compartment to the other, a second piston slidably mounted in the second bore portion, spring means for biasing the slidable valve piston toward its closed position into the bore of the partition against the second piston, said first compartment having an extended portion located at a spaced distance from the second piston, said casing having a longitudinal opening extending from the second bore portion to the extended portion of the first compartment, a pressure responsive plunger slidably mounted in the longitudinal opening for actuating the second piston which in turn moves the slidable valve piston towards its open position against the spring means, said plunger having one end extending in the second bore portion for engaging the second piston and having its other end subject to the fluid pressure in the extended portion of the first compartment, and a check valve for admitting the flow of fluid from the second compartment to the first compartment.

2. A fluid valve comprising, in combination, a valve casing having a first and a second compartment separated by a partition, said partition having a bore passing therethrough and constituting a valve opening from one of said compartments to the other, said bore also extending longitudinally into the casing upon opposite sides of the partition and forming a first bore portion on the first compartment side of the partition and a second bore portion on the second compartment side of the partition, a slidable valve piston reciprocally mounted in the first bore portion and extending across the first compartment into the bore of the partition to regulate the flow of fluid from one compartment to the other, a second piston slidably mounted in the second bore portion, spring means for biasing the slidable valve piston toward its closed position into the bore of the partition against the second piston, said first compartment having an extended portion located at a spaced distance from the second piston, said casing having a longitudinal opening extending from the second bore portion to the extended portion of the first compartment, a pressure responsive plunger slidably mounted in the longitudinal opening for actuating the second piston which in turn moves the slidable valve piston towards its open position against the spring means, said plunger having one end extending in the second bore portion for engaging the second piston and having its other end subject to the fluid pressure in the extended portion of the first compartment, a check valve for admitting the flow of fluid from the second compartment to the first compartment, and adjustable stop metering means for limiting the movement of the slidable valve piston in its open position.

3. A fluid valve comprising, in combination, a valve casing having a first and a second compartment separated by a partition, said partition having a bore passing therethrough and constituting a valve opening from one of said compartments to the other, said bore also extending longitudinally into the casing upon opposite sides of the partition and forming a first bore portion on the first compartment side of the partition and a second bore portion on the second compartment side of the partition, a slidable valve piston reciprocally mounted in the first bore portion and extending across the first compartment into the bore of the partition to regulate the flow of fluid from one compartment to the other, a second piston slidably mounted in the second bore portion, spring means for biasing the slidable valve piston toward its closed position into the bore of the partition against the second piston, said first compartment having an extended portion located at a spaced distance from the second piston, said casing having a longitudinal opening extending from the second bore portion to the extended portion of the first compartment, a pressure responsive plunger slidably mounted in the longitudinal opening for actuating the second piston which in turn moves the slidable valve piston towards its open position against the spring means, said plunger having one end extending in the second bore portion for engaging the second piston and having its other end subject to the fluid pressure in the extended portion of the first compartment, a check valve for admitting the flow of fluid from the second compartment to the first compartment, adjustable stop metering means for limiting the movement of the valve in its open position and adjustable means for varying the compression of the spring means.

4. A fluid valve comprising, in combination, a valve casing having a first and a second compartment separated by a partition, said partition having a bore passing therethrough and constituting a valve opening from one of said compartments to the other, said bore also extending longitudinally into the casing upon opposite sides of the partition and forming a first bore portion on the first compartment side of the partition and a second bore portion on the second compartment side of the partition, a slidable valve piston reciprocally mounted in the first bore portion and extending across the first compartment into the bore of the partition to regulate the flow of fluid from one compartment to the other, a second piston slidably mounted in the second bore portion, spring means for biasing the slidable valve piston toward its closed position into the bore of the partition against the second piston, said first compartment having an extended portion located at a spaced distance from the second piston, said casing having a longitudinal opening extending from the second bore portion to the extended portion of the first compartment, a pressure responsive plunger slidably mounted in the longitudinal opening for actuating the second piston which in turn moves the slidable valve piston towards its open position against the spring means, said plunger having one end extending in the second bore portion for engaging the second piston and having its other end subject to the fluid pressure in the extended portion of the first compartment, and a check valve for admitting the flow of fluid from the second compartment to the first compartment, said casing having an opening means extending from the outside thereof to the second bore portion in rear of the balancing piston.

5. A fluid valve comprising, in combination, a valve casing having a first and a second compartment separated by a partition, said partition having a bore passing therethrough and constituting a valve opening from one of said compartments to the other, said bore also extending longitudinally into the casing upon opposite sides of the partition and forming a first bore portion on the first compartment side of the partition and a second bore portion on the second compartment side of the partition, a slidable valve piston reciprocally mounted in the first bore portion and extending across the first compartment into the bore of the partition to regulate the flow of fluid from one compartment to the other, a second piston slidably mounted in the second bore portion, spring means for biasing the slidable valve piston toward its closed position into the bore of the partition against the second piston, said first compartment having an extended portion located at a spaced distance from the second piston, said casing having a longitudinal opening extending from the second bore portion to the extended portion of the first compartment, a pressure responsive plunger slidably mounted in the longitudinal opening for actuating the second piston which in turn moves the slidable valve piston towards its open position against the spring means, said plunger having one end extending in the second bore portion for engaging the second piston and having its other end subject to the fluid pressure in the extended portion of the first compartment, and a check valve for admitting the flow of fluid from the second compartment to the first compartment, said casing having an opening means extending from the outside thereof to the second bore portion in rear of the balancing piston and to the first bore portion in rear of the slidable valve piston.

PETER L. LOEWE.